United States Patent [19]
Hashimoto

[11] Patent Number: 5,815,668
[45] Date of Patent: Sep. 29, 1998

[54] SLAVE INTER-LAN CONNECTION DEVICE, AN INTER-LAN CONNECTION SYSTEM AND A HOT STANDBY METHOD OF SAID INTER-LAN CONNECTION SYSTEM

[75] Inventor: Akira Hashimoto, Tokyo, Japan

[73] Assignee: NEC Corporation, Tokyo, Japan

[21] Appl. No.: 616,342

[22] Filed: Mar. 15, 1996

[30] Foreign Application Priority Data

Mar. 17, 1995 [JP] Japan .................................. 7-086133

[51] Int. Cl.⁶ .................................................. G06F 15/16
[52] U.S. Cl. .............................. 395/200.68; 395/200.54
[58] Field of Search .................... 395/200.68, 200.69,
395/200.7–200.71, 198; 370/351–356, 392,
397, 399, 377, 709, 909, 401; 379/220–221,
272–273; 390/827

[56] References Cited

U.S. PATENT DOCUMENTS 5,473,599  12/1995  Li et al. ...................................... 370/16
5,490,252   2/1996  Maceru et al. ....................... 395/200.01
5,519,704   5/1996  Farinacci et al. ..................... 370/85.13
5,621,884   4/1997  Beshears et al. .................... 395/182.08

OTHER PUBLICATIONS

News Release, "Cisco's New Hot Standby Router Protocol Brings Fast Re–Routing to the Desktop", Cisco Systems, LTTpi//www.cisco.com/warp/public/146/129.intl Jun. 1994.

*Primary Examiner*—Mehmet B. Geckil
*Attorney, Agent, or Firm*—Sughrue, Mion, Zinn, Macpeak & Seas, PLLC

[57] ABSTRACT

The present invention has both a master router and a slave router on a route. The slave router comprises an address setting section 9 for setting a physical address and a network address of the master router as well as its own physical address, and a control section 12 for conducting routing operation and controlling a ping test section 10 and routing/ARP table 11. While halting routing operation, the slave router receives a broadcast packet and a control packet sent to the address of the master router, makes a routing/ARP table same as that of the master router, regularly conducts a ping test to a LAN interface of the master router, and decides that the master router is in malfunction when the master router makes no response to the ping test. Then, the slave router starts routing operation instead of the master router.

13 Claims, 4 Drawing Sheets

| HARDWARE | PROTOCOL | HLEN | PLEN | OPERATION | SENDER ADDRESS | TARGET ADDRESS |
|---|---|---|---|---|---|---|

| TARGET NETWORK ADDRESS | NEXT HOP NETWORK ADDRESS | INTERFACE | METRIC |
|---|---|---|---|
| 133.200.1.1 | DIRECT | INTF-1 | 1 |
| 133.200.2.1 | 133.200.1.199 | INTF-1 | 2 |
| 133.200.1.5 | DIRECT | INTF-1 | 1 |
| 133.200.1.10 | DIRECT | INTF-1 | 1 |
| 133.200.3.1 | 133.200.1.99 | INTF-1 | 3 |
| 133.200.1.7 | DIRECT | INTF-1 | 1 |
| 133.200.1.99 | DIRECT | INTF-1 | 1 |
| 133.200.1.199 | DIRECT | INTF-1 | 1 |

FIG.7

| TARGET NETWORK ADDRESS | TARGET MAC ADDRESS |
|---|---|
| 1 3 3 . 2 0 0 . 1 . 1 | 0 0 0 0 4 c 0 0 0 0 0 1 |
| 1 3 3 . 2 0 0 . 1 . 1 | 0 0 0 0 4 c 0 0 0 0 0 2 |
| ≈ | ≈ |
| 1 3 3 . 2 0 0 . 1 . 1 0 | 0 0 0 0 4 c 0 0 0 0 0 3 |
| 1 3 3 . 2 0 0 . 1 . 7 | 0 0 0 0 4 c 0 0 0 0 0 4 |
| 1 3 3 . 2 0 0 . 1 . 9 9 | 0 0 0 0 4 c 0 0 0 0 0 5 |
| 1 3 3 . 2 0 0 . 1 . 1 9 9 | 0 0 0 0 4 c 0 0 0 0 0 6 |

SLAVE INTER-LAN CONNECTION DEVICE, AN INTER-LAN CONNECTION SYSTEM AND A HOT STANDBY METHOD OF SAID INTER-LAN CONNECTION SYSTEM

BACKGROUND OF THE INVENTION

This invention relates to an inter-LAN (Local Area Network) connection device such as a bridge or a router and, more particularly, to a hot standby method where two inter-LAN connection devices are used on a route as a master and a slave.

Conventionally, to treat two inter-LAN connection devices on a route logically same on a network as a master and a slave, physical addresses and network addresses of the two inter-LAN connection devices must be coincided. However, a physical address and a network address must be unique on a network. Therefore, to use the two inter-LAN connection devices as a master and a slave, two inter-LAN connection devices are treated as logically separate machines and the dynamic routing or the static routing is used as a routing method.

The aforementioned prior method requires to change a routing table of a host that sends packets to an inter-LAN connection device when switching a master to a slave system. As a result, there has been a problem that it takes a certain time to complete the switching process.

SUMMARY OF THE INVENTION

It is an object of the present invention to solve the aforementioned problem and provide an inter-LAN connection device and a method that enable to reduce the time required to switch a master system to a slave system.

The objects of the present invention are achieved by a slave inter-LAN (Local Area Network, referred to as LAN hereinafter) connection device that is connected to a route where at least one master inter-LAN connection device is connected, the slave inter-LAN connection device comprising:

generation means for halting routing operation of the slave inter-LAN connection device while the master inter-LAN connection device is running, and generating routing information and correspondence information corresponding network information and physical information where the routing information and correspondence information are the same as those of master inter-LAN connection device; and substitution means for detecting malfunction of the master inter-LAN connection device, and conducting routing operation instead of the master inter-LAN connection device based on the routing information and the correspondence information when the master inter-LAN connection device is in malfunction.

BRIEF DESCRIPTION OF THE DRAWINGS

This and other objects, features and advantages of the present invention will become more apparent upon a reading of the following detailed description and drawings, in which:

FIG. 7 is a figure showing an example of an ARP table.

DESCRIPTION OF THE PREFERRED EMBODIMENTS

Figure 1:
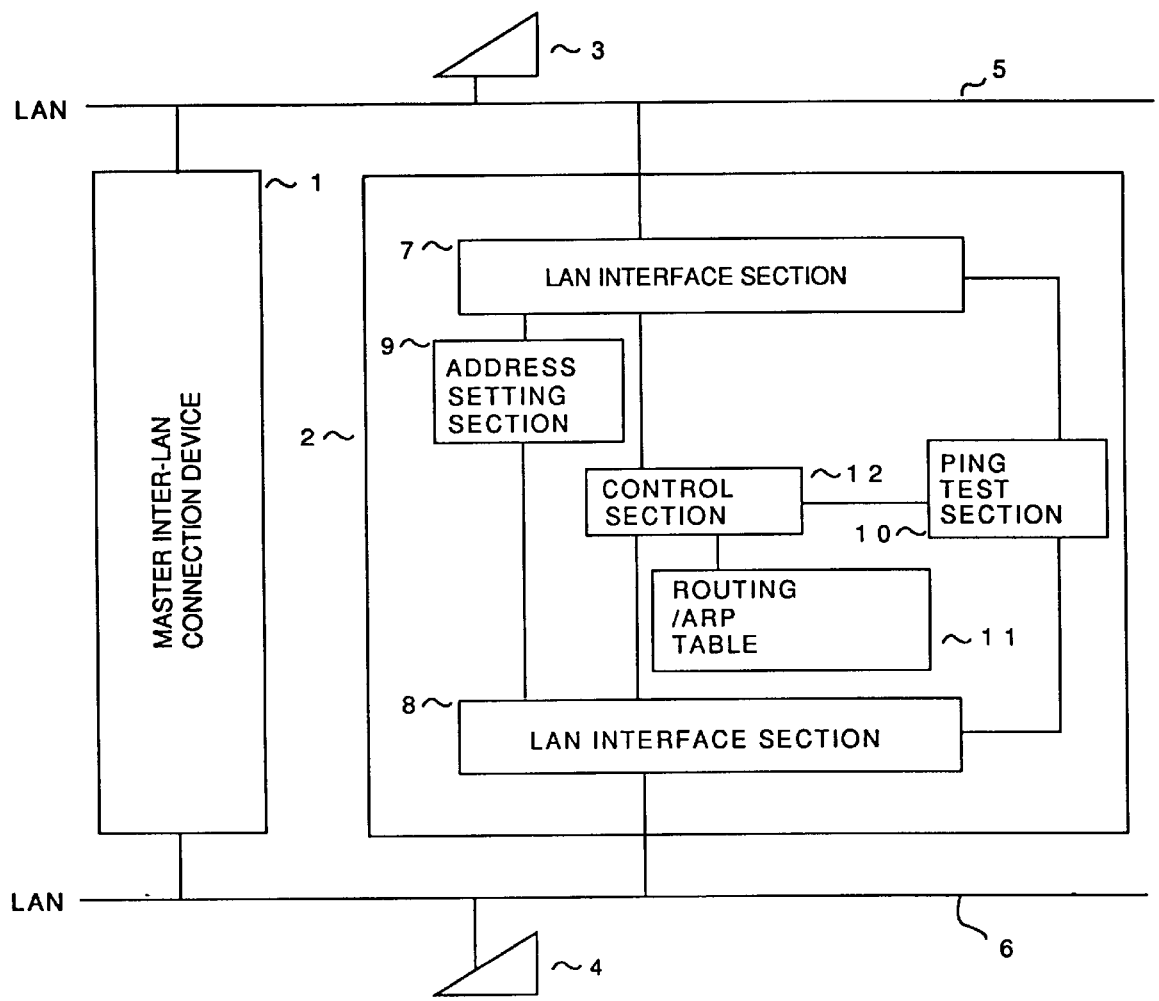
FIG. 1 is a figure to explain an embodiment of the present invention.

An embodiment of the present invention is described referring to the drawings.

An embodiment of the present invention is explained below, referring to the drawings.

FIG. 1 illustrates an embodiment of the present invention. In this figure, a first LAN terminal 3 is connected to a first LAN 5. A second LAN terminal 4 is connected to a second LAN 6. A master inter-LAN connection device 1 and a slave inter-LAN connection device 2 are connected between the first LAN 5 and the second LAN 6. The first LAN terminal 3 and the second LAN terminal 4 communicate using TCP (Transmission Control Protocol)/IP(Internet Protocol), so that dynamic routing is applied to the first LAN terminal 3 and the second LAN terminal 4, the master inter-LAN connection device 1 and the slave inter-LAN connection device 2. A standard RIP (Routing Information Protocol) is used to execute dynamic routing.

The slave inter-LAN connection device 2 comprises: a first and second LAN interface sections 7 and 8 for connecting with the first and second LANs 5 and 6; an address setting section 9 for setting a physical address and a network address of the LAN interface section of the master inter-LAN connection device 1 as well as those of the first and second LAN interface sections 7 and 8; a routing/ARP (Address Resolution Protocol) table 11 for holding routing/ARP information sent from the first and second LAN interface sections 7 and 8; a ping test section 10 for testing operation status of the first and second LAN interface sections 7 and 8 in the master inter-LAN connection device 1; and a control section 12 for controlling the LAN interface sections 7 and 8, the routing/ARP table 11 and the ping test section 10. ICMP (Internet Control Message Protocol, IP network management protocol) tests a connection condition of routing using an echo request message, which is called "ping (Packet InterNet Gropper)" (because you will check whether receiving a response like an echo from the host you want to communicate with.)

Figure 2:
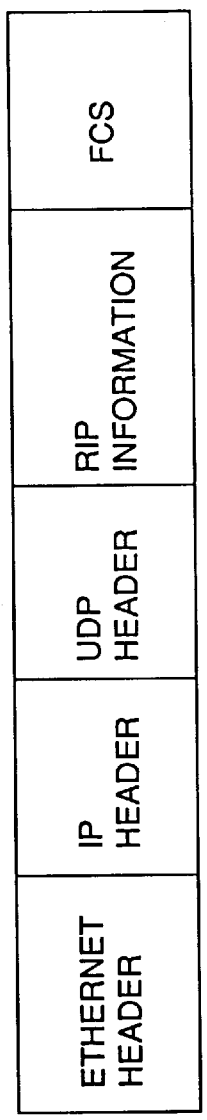
FIG. 2 is a figure showing an RIP packet format.
Figure 3:
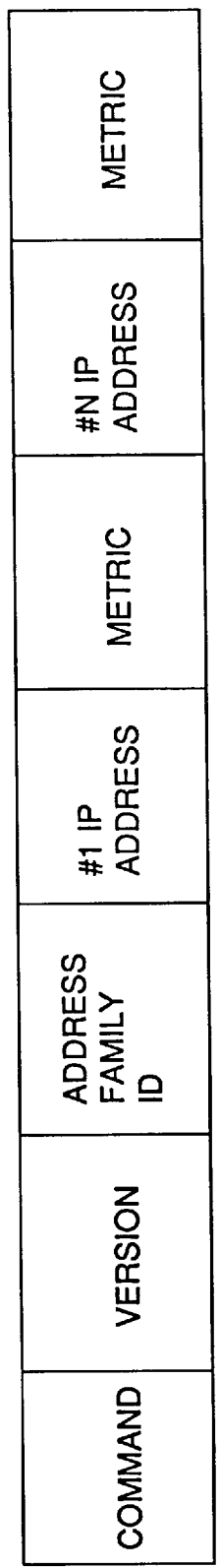
FIG. 3 is a figure showing a format in an RIP information field in an RIP packet.

FIG. 2 illustrates the format of RIP (Routing Information Protocol) packet. FIG. 3 illustrates the format of an RIP information field in the RIP packet.

RIP is a protocol for providing a routing control on the linkage and metric direction. As RIP response packets in the formats given in FIGS. 2 and 3 which contain information on the metric for communication between you and the host on the network, when receiving an RIP request packet connected with a LAN terminal and/or an inter-LAN connection device (called 'device') on the LAN, a device regularly using RIP sends this protocol. The device which receives the RIP response packet stores the contents into a routing table, whereby the contents are dynamically updated in response to any change in the configuration of the network. That allows the host to keep track of the shortest communication route.

ARP (Address Resolution Protocol) is used to dynamically find a network address in an upper layer corresponding to a physical network hardware address in a lower layer (called "IP address", an address consisting of 32 bits which is given to a network and a host machine and is typically divided by 8 bits, displayed, for example, like 192.0.2.1). The ARP determines the relationship between a network address and a physical address connected on a network (for example, an MAC (Media Access Control) address consisting of 48 bits for an Ethernet). For example, an ARP request/response,packet has the packet format illustrated in FIGS. 4 and 5.

Figures 4, 5, 6:
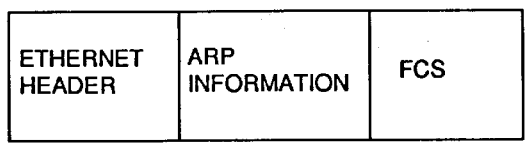
FIG. 4 is a figure showing an AIP packet format.
FIG. 5 is a figure showing a format in an AIP information field in an AIP packet.
FIG. 6 is a figure showing an example of a routing table.

In FIG. 5, a network address and a physical address are written as 'a sender address', the network address is written as 'a target address' into the ARP information field, and an ARP request packet indicating 'request' as an operation is sent, whereby 'response' is indicated as the operation and an ARP response packet into which the network address and physical address of the sender are written is returned when a device having the target address exists in the network.

Next, the process where while the LAN terminal 3 is communicating with the LAN terminal 4 via the master inter-LAN connection device 1, the master inter-LAN connection device 1 gets to malfunction and the slave inter-LAN connection device 2 is substituted for the master inter-LAN connection device 1 is described below.

It is supposed that the master inter-LAN connection device 1 is in operation and the slave inter-LAN connection device 2 halts only routing operation.

The master inter-LAN connection device 1 creates a routing table from an RIP response packet corresponding to an RIP request packet made by the device 1 and a regular RIP response packet, and creates an ARP table from an ARP response packet corresponding to an ARP request packet.

Simultaneously, using a physical address and a network address of a LAN interface section of the master inter-LAN connection device 1 set in an address section 9 of the slave inter-LAN connection device 2, the same table, that is, the routing/APR table 11 as the routing table and the ARP table possessed by the master inter-LAN connection device 1 from the RIP response packet and the ARP response packet received in the first and second LAN interfaces section 7 and 8.

Similarly, the LAN terminals 3 and 4 compose a routing table and an ARP table, replying the RIP and ARP operations.

FIG. 6 illustrates an example of a routing table. In FIG. 6, an IP address is shown in the "target network" column. "Direct" in the "Next hop network address" column indicates that a destination node exists in the same LAN (metric 1) and an IP address in the column (for example, 133.200.1.199) shows a route for accessing another LAN via a router of the IP address or a gateway (allocated between the same LAN as its own LAN and another LAN) (metric 2). An RIP provides dynamic routing control based on, for example, the number of hops proportionate to the number of routers which relays halfway. A form of LAN interface hardware etc. is specified in the "interface" column.

FIG. 7 illustrates an example of an ARP table. Referring to FIG. 7, a physical address (an MAC address, hexadecimal display, 48-bit length) mapped by the ARP is stored in the corresponding position for the network address (IP address).

Each device operates based on the routing table and the ARP table. The first LAN terminal 3 sends transmission data to the master inter-LAN connection device 1. The master inter-LAN connection device 1 transfers the data to the second LAN terminal 4. On receiving the data, the second LAN terminal 4 sends the transmission data to the master inter-LAN connection device 1. The master inter-LAN connection device 1 transmits the data to the first terminal 3. The communication is executed through the above process.

The slave inter-LAN connection device 2 learns the operation of the LAN interface section of the master inter-LAN connection device 1 from ping test section 10 under the control of a control section 12, that is, the ping test section 10 regularly sends a ping packet to each LAN interface section (not shown in the figure) in the master inter-LAN connection device 1 to monitor a response returned from the master inter-LAN connection device 1. For example, the master inter-LAN connection device 1 is considered in operation when an echo request message of an ICMP is sent as a ping packet to the master inter-LAN connection device 1 and an echo response message is sent back from the master inter-LAN connection device 1 within a given timeout period.

When the master inter-LAN connection device 1 makes no response (an echo response), the slave inter-LAN connection device 2 regards that the master inter-LAN connection device 1 is in malfunction and starts routing operation based on a routing/ARP table using a physical address and a network address of the LAN interface section of the master inter-LAN connection device 1 set in address setting section 9 to start operation as a master device.

By this operation, the first LAN terminal 3 and the second LAN terminal 4 communicate via the slave inter-LAN connection device 2 instead of the master inter-LAN connection device 1.

An example of protection against an intermittent malfunction of the master inter-LAN connection device 1 is given below. When having received no response to a ping packet that was sent by the slave inter-LAN connection device 2 itself, the slave inter-LAN connection device 2 stops sending a ping packet. While the master inter-LAN connection device 1 stops routing operation when it becomes not to receive a ping packet.

The present invention has been explained with the aforementioned embodiment. The present invention can be applied to various types of cases adherent to the principles of the present invention, not limited to the aforementioned cases. For example, the present invention is also applicable to inter-LAN connection devices on various types of networks where an IP address is mapped as well as an Ethernet using an IP addresses LAN and FDDI (Fiber Distributed Data Interface).

As aforementioned, the present invention enables the slave inter-LAN connection device to automatically possess the same table as a routing/ARP table possessed by the master inter-LAN connection device under the circumstances that the slave inter-LAN connection device halts routing operation in a configuration where a master inter-LAN connection device and a slave inter-LAN connection device are connected on the same route. So, the slave inter-LAN connection device can instantly start routing operation as a master device when detecting trouble in the master inter-LAN connection device. This leads to the conclusion that the present invention is effective in reducing downtime for network.

What is claimed is:

1. A slave device, for interconnecting local area networks (LANs), connected to a route to which a master device for interconnecting said LANs is connected, said master device having respective routing information and respective correspondence information, said slave device comprising:

means for detecting a malfunction state of said master device;

means for generating respective routing information and respective correspondence information concurrently with and identical to said respective routing information and said respective correspondence information of said master device, said respective routing information corresponding to network information, said correspondence information corresponding to physical information;

means for inhibiting a routing operation of said slave device when said means for detecting does not indicate that said master device is in said malfunction state; and means for enabling said routing operation of said slave device when said means for detecting indicates that said master device is in said malfunction state, said routing operation being based on said routing information and said correspondence information, said means for enabling defining a substitution means of said slave device.

2. The slave device of claim 1, wherein said respective routing information and said respective correspondence information, generated by said means for generating, includes a routing table and an address resolution protocol (ARP) table based on a routing information protocol response packet and an ARP response packet.

3. The slave device of claim 1, wherein said means for detecting regularly sends a test message to said master device and indicates that said master device is in said malfunction state in the absence of a response to said test message.

4. The slave device of claim 3, wherein:

after said means for enabling enables said routing operation of said slave device, said means for detecting continues regularly to send said test message to said master device; and after said indication of said malfunction state, said means for detecting is responsive to a test message response by said master device to indicate to said means for inhibiting that said master device is not in said malfunction state.

5. A system for interconnecting local area networks (LANs), comprising:

a master device interconnecting said LANs and having respective routing information and respective correspondence information; and a slave device comprising:

means for detecting a malfunction state of said master device;

means for generating respective routing information and respective correspondence information concurrently with and identical to said respective routing information and said respective correspondence information of said master device, said respective routing information corresponding to network information, said correspondence information corresponding to physical information;

means for inhibiting a routing operation of said slave device when said means for detecting does not indicate that said master device is in said malfunction state; and means for enabling said routing operation of said slave device when said means for detecting indicates that said master device is in said malfunction state, said routing operation being based on said routing information and said correspondence information, said means for enabling defining a substitution means of said slave device.

6. The system for interconnecting local area networks of claim 5, wherein said respective routing information and said respective correspondence information, generated by said means for generating, includes a routing table and an address resolution protocol (ARP) table based on a routing information protocol response packet and an ARP response packet.

7. The system for interconnecting local area networks of claim 5, wherein said means for detecting regularly sends a test message to said master device and indicates that said master device is in said malfunction state in the absence of a response to said test message.

8. The system for interconnecting local area networks of claim 5, wherein:

after said means for enabling enables said routing operation of said slave device, said means for detecting continues regularly to send said test message to said master device; and after said indication of said malfunction state, said means for detecting is responsive to a test message response by said master device to indicate to said means for inhibiting that said master device is not in said malfunction state.

9. The system for interconnecting local area networks of claim 5, wherein:

said master device further comprises a respective master LAN interface interconnecting said LANs;

said slave device further comprises:

a respective slave LAN interface for interconnecting said LANs;

address setting means for setting a respective physical address and a respective network address of said slave LAN interface, and for setting a respective physical address and a respective network address of said master LAN interface;

a routing/ARP table for holding, as a table, routing information and ARP information received in said slave LAN interface;

ping test means for testing an operation status of said master LAN interface; and control means for controlling said slave LAN interface, said routing/ARP table, and said ping test means.

10. In an inter-LAN connection system having a master inter-LAN connection device and a slave inter-LAN connection device connected to the same route, a hot standby method comprising:

generating, at said slave device, respective routing information and respective correspondence information concurrently with and identical to routing information and correspondence information of said master device, said respective routing information corresponding to network information, said correspondence information corresponding to physical information;

detecting a malfunction state of said master device;

enabling a routing operation of said slave device, in response to said detection of said malfunction state of said master device, based on said respective routing information and said respective correspondence information.

11. The hot standby method of claim 10, wherein said respective routing information and said respective correspondence information, generated at said slave device, includes a routing table and an address resolution protocol (ARP) table based on a routing information protocol response packet and an ARP response packet.

12. The hot standby method of claim 10, wherein said step of detecting a malfunction state of said master device comprises regularly sending a test message to said master device and indicating said master device is in said malfunction state in the absence of a response to said test message.

13. The hot standby method of claim 12, further comprising:

after said enabling step, continuing regularly to send said test message to said master device; and after said detecting step, responding to a test message response from said master device by disabling said routing operation of said slave device.

\* \* \* \* \*